(12) United States Patent
Wang et al.

(10) Patent No.: US 10,999,047 B2
(45) Date of Patent: May 4, 2021

(54) FREQUENCY BAND CONFIGURATION APPARATUS, METHOD AND COMMUNICATION SYSTEM

(71) Applicant: FUJITSU LIMITED, Kawasaki (JP)

(72) Inventors: Weiwei Wang, Beijing (CN); Xin Wang, Beijing (CN); Lei Song, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 1 day.

(21) Appl. No.: 16/053,464

(22) Filed: Aug. 2, 2018

(65) Prior Publication Data

US 2018/0343105 A1 Nov. 29, 2018

Related U.S. Application Data

(63) Continuation of application No. PCT/CN2016/074126, filed on Feb. 19, 2016.

(51) Int. Cl.
*H04L 5/16* (2006.01)
*H04L 5/00* (2006.01)
(Continued)

(52) U.S. Cl.
CPC .............. *H04L 5/16* (2013.01); *H04L 5/001* (2013.01); *H04L 5/0053* (2013.01);
(Continued)

(58) Field of Classification Search
CPC ....... H04L 5/16; H04L 5/1469; H04L 5/0053; H04L 5/14; H04L 5/001; H04L 5/0092;
(Continued)

(56) References Cited

U.S. PATENT DOCUMENTS

| | | |
|---|---|---|
| 2007/0054625 A1 | 3/2007 | Beale |
| 2007/0286156 A1 | 12/2007 | Gormley et al. |

(Continued)

FOREIGN PATENT DOCUMENTS

| | | |
|---|---|---|
| CN | 101326774 A | 12/2008 |
| CN | 101917259 A | 12/2010 |

(Continued)

OTHER PUBLICATIONS

International Search Report issued by the State Intellectual Property Office of China for corresponding International Patent Application No. PCT/CN2016/074126, dated Nov. 14, 2016, with an English translation.

(Continued)

*Primary Examiner* — Kiet Tang
(74) *Attorney, Agent, or Firm* — Myers Wolin, LLC

(57) ABSTRACT

A frequency band configuration apparatus and method of a half-duplex system and a communication system. The method includes: determining a half-duplex frequency band, and receiving configuration information of the half-duplex frequency band; and receiving indication information for reconfiguring the half-duplex frequency band transmitted by a network device; the indication information indicates that the half-duplex frequency band is used for both uplink transmission and downlink transmission. Hence, it is supported that the half-duplex frequency band can be configured as both an uplink frequency band and a downlink frequency band at the same time, a cell capacity is not limited too much, and cases where uplink and downlink capacities are relatively large can be well supported.

14 Claims, 8 Drawing Sheets

101 a UE determines a half-duplex frequency band, and receives configuration information of the half-duplex frequency band

102 the UE receives indication information for reconfiguring the half-duplex frequency band transmitted by a network device; the indication information indicates that the half-duplex frequency band is used for both uplink transmission and downlink transmission

(51) Int. Cl.
  *H04L 5/14* (2006.01)
  *H04W 72/12* (2009.01)
  *H04W 72/04* (2009.01)

(52) U.S. Cl.
  CPC .......... *H04L 5/0091* (2013.01); *H04L 5/0092* (2013.01); *H04L 5/14* (2013.01); *H04L 5/1469* (2013.01); *H04W 72/042* (2013.01); *H04W 72/0453* (2013.01); *H04W 72/12* (2013.01); *H04W 72/1289* (2013.01); *H04L 5/0044* (2013.01)

(58) Field of Classification Search
  CPC .... H04L 5/0091; H04L 5/0044; H04W 72/12; H04W 72/1289; H04W 72/0453; H04W 72/042
  See application file for complete search history.

(56) References Cited

U.S. PATENT DOCUMENTS

| | | | |
|---|---|---|---|
| 2014/0328283 A1 | 11/2014 | Wan et al. | |
| 2015/0195838 A1* | 7/2015 | Montojo | H04L 5/14 370/277 |
| 2017/0325248 A1* | 11/2017 | Mizusawa | H04W 72/12 |

FOREIGN PATENT DOCUMENTS

| | | |
|---|---|---|
| CN | 102547720 A | 7/2012 |
| CN | 102685755 A | 9/2012 |
| CN | 103220723 A | 7/2013 |
| CN | 103906242 A | 7/2014 |
| CN | 102685755 B | 12/2016 |
| EP | 2 680 654 A1 | 1/2014 |

OTHER PUBLICATIONS

Written Opinion of the International Searching Authority issued by the State Intellectual Property Office of China for corresponding International Patent Application No. PCT/CN2016/074126, dated Nov. 14, 2016, with an English translation.

Lang et al, "Research on LTE-Advanced Carrier Aggregation Technology", vol. 12, 2012, with English abstract.

Notice of Reasons for Refusal issued for corresponding Japanese Patent Application No. 2018-541696, dated Jul. 30, 2019 with full English Translation.

* cited by examiner

FREQUENCY BAND CONFIGURATION APPARATUS, METHOD AND COMMUNICATION SYSTEM

CROSS REFERENCE TO RELATED APPLICATIONS

This application is a continuation application of International Application PCT/CN2016/074126 filed on Feb. 19, 2016, the entire contents of which are incorporated herein by reference.

TECHNICAL FIELD

This disclosure relates to the field of communication technologies, and in particular to a frequency band configuration apparatus and method of a half-duplex system and a communication system.

BACKGROUND

In an existing half-duplex system, a frequency band is configured as either a time division duplex (TDD) band or a frequency division duplex (FDD) band. Specifically, the TDD band is allocated for DL and UL transmission in different time slots by using a carrier frequency (such as $f_1$), while the FDD band includes two different carrier frequencies (such as $f_1$ and $f_2$), which are allocated for DL and UL transmission, respectively. In this sense, user equipments (UEs) in the same cell can be served in either DL or UL transmission over the same carrier at the same time.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that although transmission methods of the existing TDD system or FDD system are relatively easy in implementation and interference is not complex, cell capacities are relatively limited, and cases where uplink and downlink capacities are relatively large may not be well supported.

Embodiments of this disclosure provide a frequency band configuration apparatus and method of a half-duplex system and a communication system, which support that the half-duplex frequency band is configured as an uplink frequency band and a downlink frequency band at the same time.

According to a first aspect of the embodiments of this disclosure, there is provided a frequency band configuration method, including:

determining, by a UE, a half-duplex frequency band, and receiving configuration information of the half-duplex frequency band; and receiving, by the UE, indication information for reconfiguring the half-duplex frequency band transmitted by a network device; wherein, the indication information indicates that the half-duplex frequency band is used for both uplink transmission and downlink transmission.

According to a second aspect of the embodiments of this disclosure, there is provided a frequency band configuration apparatus, configured in a UE in a half-duplex system, the frequency band configuration apparatus including:

an information receiving unit configured to determine a half-duplex frequency band, and receive configuration information of the half-duplex frequency band; and an indication receiving unit configured to receive indication information for reconfiguring the half-duplex frequency band transmitted by a network device; wherein, the indication information indicates that the half-duplex frequency band is used for both uplink transmission and downlink transmission.

According to a third aspect of the embodiments of this disclosure, there is provided a frequency band configuration method, including:

transmitting, by a network device, configuration information of a half-duplex frequency band to a UE; and transmitting, by the network device, indication information for reconfiguring the half-duplex frequency band to the UE; wherein, the indication information indicates that the half-duplex frequency band is used for both uplink transmission and downlink transmission.

According to a fourth aspect of the embodiments of this disclosure, there is provided a frequency band configuration apparatus, configured in a network device in a half-duplex system, the frequency band configuration apparatus including:

an information transmitting unit configured to transmit configuration information of a half-duplex frequency band to a UE; and an indication transmitting unit configured to transmit indication information for reconfiguring the half-duplex frequency band to the UE; wherein, the indication information indicates that the half-duplex frequency band is used for both uplink transmission and downlink transmission.

According to a fifth aspect of the embodiments of this disclosure, there is provided a communication system, including:

a base station configured to transmit configuration information of a half-duplex frequency band to a UE, and transmit indication information for reconfiguring the half-duplex frequency band to the UE; wherein, the indication information indicates that the half-duplex frequency band is used for both uplink transmission and downlink transmission; and the UE configured to obtain configuration information of the half-duplex frequency band, and receive indication information for reconfiguring the half-duplex frequency band.

An advantage of the embodiments of this disclosure exists in that the UE receives the indication information for reconfiguring the half-duplex frequency band transmitted by the network device; the indication information indicates that the half-duplex frequency band is used for both uplink transmission and downlink transmission. Hence, it is supported that the half-duplex frequency band can be configured as both an uplink frequency band and a downlink frequency band at the same time, a cell capacity is not limited too much, and cases where uplink and downlink capacities are relatively large can be well supported.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

In the embodiments of the present disclosure, a base station may be referred to as an access point, a broadcast transmitter, a node B, or an evolved node B (eNB), etc., and may include some or all functions of them. A term "base station" shall be used in the text, and each base station provides communication coverage for a specific geographical region. A term "cell" may refer to a base station and/or a coverage region thereof, depending on the context using the term.

In the embodiments of the present disclosure, a mobile station or equipment may be referred to as a user equipment (UE). The UE may be fixed or mobile, and may also be referred to as a mobile station, a terminal, an access terminal, a user unit, or a station, etc. The UE may be a cellular phone, a personal digital assistant (PDA), a wireless modem, a wireless communication device, a handhold device, a lap-top computer, and a cordless telephone, etc.

Embodiment 1

Figure 1:
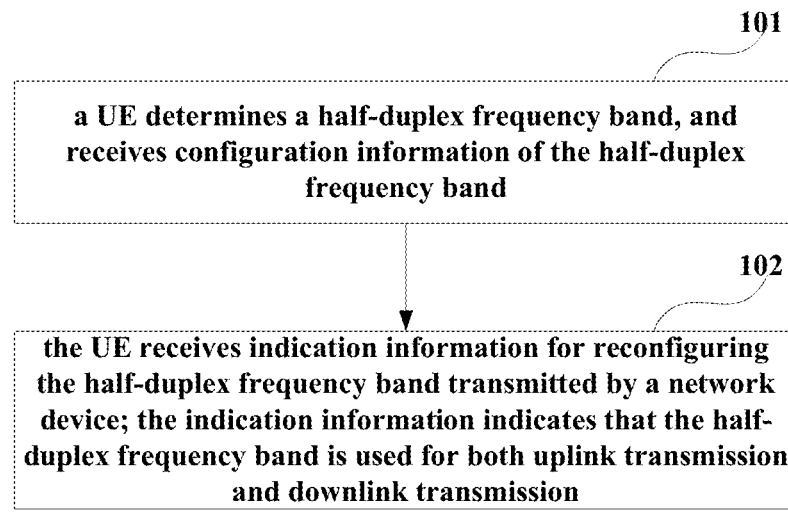
FIG. 1 is a flowchart of the frequency band configuration method of Embodiment 1 of this disclosure.

The embodiment of the present disclosure provides a frequency band configuration method, applicable to a UE in a half-duplex system. FIG. 1 is a flowchart of the frequency band configuration method of the embodiment of this disclosure. As shown in FIG. 1, the frequency band configuration method includes:

Block 101: a UE determines a half-duplex frequency band, and receives configuration information of the half-duplex frequency band; and Block 102: the UE receives indication information for reconfiguring the half-duplex frequency band transmitted by a network device; the indication information indicates that the half-duplex frequency band is used for both uplink transmission and downlink transmission.

In this embodiment, the network device may be a macro base station (such as an eNB), and macro cells generated by the macro base station may serve for the UE; or the network side device may also be a pico base station, and pico cells generated by the pico base station may serve for the UE; or the network side device may be other devices. However, this disclosure is not limited thereto, and a particular scenario may be determined according to an actual situation.

In this embodiment, the half-duplex frequency band may be a TDD frequency band, or an FDD downlink frequency band, or an FDD uplink frequency band, or an unlicensed frequency band. After the UE searches out a half-duplex frequency band, it may receive a system message (such as an SIB1) transmitted by the network device (such as a base station), the system message indicating configuration information of the frequency band. Hence, the UE may determine whether the half-duplex frequency band is a TDD frequency band, or an FDD frequency band, etc., according to the configuration information.

In this embodiment, after searching out the half-duplex frequency band and obtaining corresponding configuration information, the UE may further receive the indication information for reconfiguring the half-duplex frequency band transmitted by the network device; the indication information indicates that the half-duplex frequency band is used for both uplink transmission and downlink transmission.

For example, after the UE searches out a half-duplex frequency band, it receives a system message (such as an SIB1) indicating the TDD configuration information of the frequency band and transmitted by the base station (such as an eNB), and the UE identifies the frequency band as a TDD frequency band. Furthermore, the base station will transmit indication information to indicate that the TDD frequency band may be taken as an uplink frequency band and a downlink frequency band at the same time. Hence, the TDD frequency band is dynamically reconfigured. Alternatively, the indication information may designate related information of the frequency band, such as a carrier frequency, and a bandwidth, etc.

Figure 2:
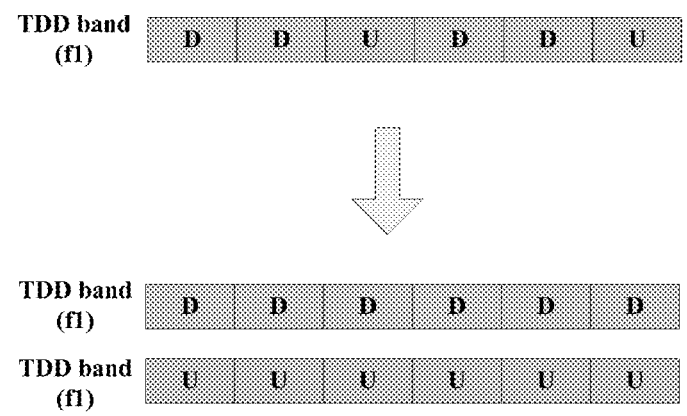
FIG. 2 is a schematic diagram of a TDD frequency band that is dynamically reconfigured in Embodiment 1 of this disclosure.

FIG. 2 is a schematic diagram of the TDD frequency band that is dynamically configured as an uplink frequency band and a downlink frequency band in the embodiment of this disclosure. As shown in FIG. 2, a carrier frequency of the conventional TDD frequency band is f1, and the TDD configuration information indicates that the TDD frequency band includes two uplink subframes and four downlink subframes, that is, the TDD frequency band may only perform uplink transmission (on an uplink subframe) or downlink transmission (on a downlink subframe) at a moment. After being reconfigured by the indication information, the TDD frequency band may perform uplink transmission and downlink transmission at any moment. And whether uplink transmission or downlink transmission is performed at a moment may be determined by, for example, the scheduling information.

For another example, after the UE searches out a frequency band, it receives a system message (such as an SIB2) indicating the FDD configuration information corresponding to the frequency band and transmitted by the base station (such as an eNB), and the UE identifies the frequency band as an FDD downlink frequency band. Furthermore, the base station may transmit indication information to indicate that the FDD downlink frequency band may be taken as an uplink frequency band and a downlink frequency band at the same time. Hence, the FDD downlink frequency band is dynamically reconfigured. Alternatively, the indication information may designate related information to the frequency band, such as a carrier frequency, and a bandwidth, etc.

Figure 3:
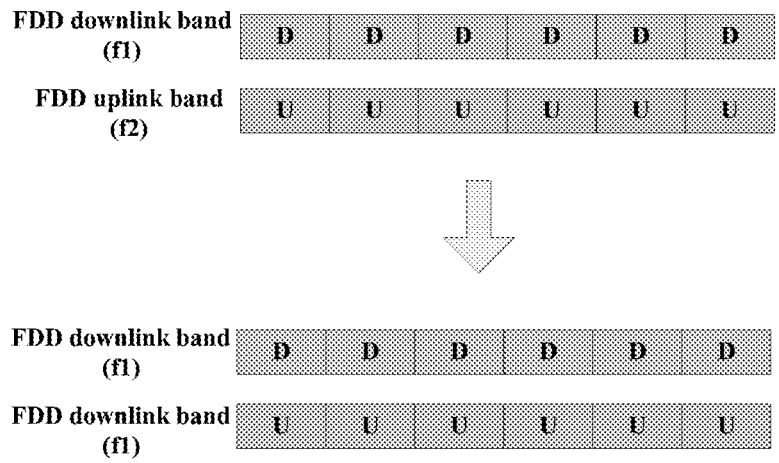
FIG. 3 is a schematic diagram of an FDD downlink frequency band that is dynamically reconfigured in Embodiment 1 of this disclosure.

FIG. 3 is a schematic diagram of the FDD downlink frequency band that is dynamically configured as an uplink frequency band and a downlink frequency band in the embodiment of this disclosure. As shown in FIG. 3, a carrier frequency of the conventional FDD downlink frequency band is f1, and a carrier frequency of the FDD uplink frequency band is f2, that is, the FDD downlink frequency band may only perform downlink transmission at any moment. After being reconfigured by the indication information, the FDD downlink frequency band may perform uplink transmission and downlink transmission at any moment. And whether uplink transmission or downlink transmission is performed at a moment may be determined by, for example, the scheduling information.

For another example, after the UE searches out a frequency band, it receives a system message (such as an SIB2) indicating the FDD configuration information corresponding to the frequency band and transmitted by the base station (such as an eNB), and the UE identifies an uplink frequency band corresponding to the frequency band as an FDD uplink frequency band. Furthermore, the base station will transmit indication information to indicate that the FDD uplink frequency band may be taken as an uplink frequency band and a downlink frequency band at the same time. Hence, the FDD uplink frequency band is dynamically reconfigured. Alternatively, the indication information may designate related information to the frequency band, such as a carrier frequency, and a bandwidth, etc.

Figure 4:
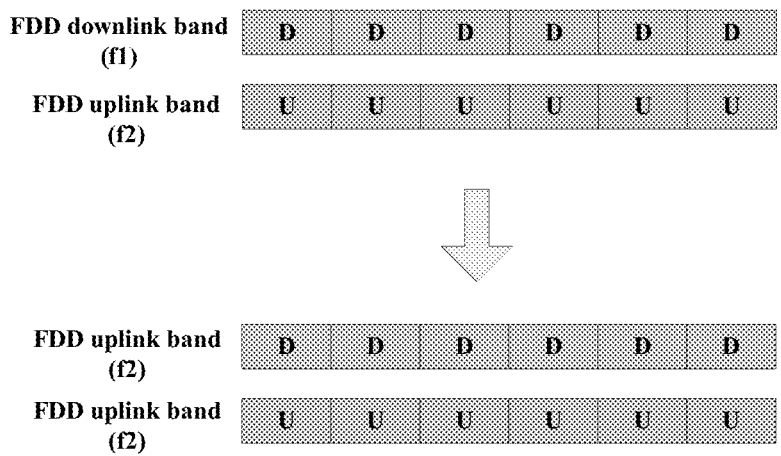
FIG. 4 is a schematic diagram of an FDD uplink frequency band that is dynamically reconfigured in Embodiment 1 of this disclosure.

FIG. 4 is a schematic diagram of the FDD uplink frequency band that is dynamically configured as an uplink frequency band and a downlink frequency band in the embodiment of this disclosure. As shown in FIG. 4, a carrier frequency of the conventional FDD uplink frequency band is f2, and a carrier frequency of the FDD downlink frequency band is f1, that is, the FDD uplink frequency band may only perform uplink transmission at any moment. After being reconfigured by the indication information, the FDD uplink frequency band may perform uplink transmission and downlink transmission at any moment. And whether uplink transmission or downlink transmission is performed at a moment may be determined by, for example, the scheduling information.

For another example, after the UE searches out a frequency band, it may determine that the frequency band is an unlicensed frequency band. Furthermore, the base station will transmit indication information to indicate that the unlicensed frequency band may be taken as an uplink frequency band and a downlink frequency band at the same time. Hence, the unlicensed frequency band is dynamically reconfigured. Alternatively, the indication information may designate related information to the frequency band, such as a carrier frequency, and a bandwidth, etc.

Figure 5:
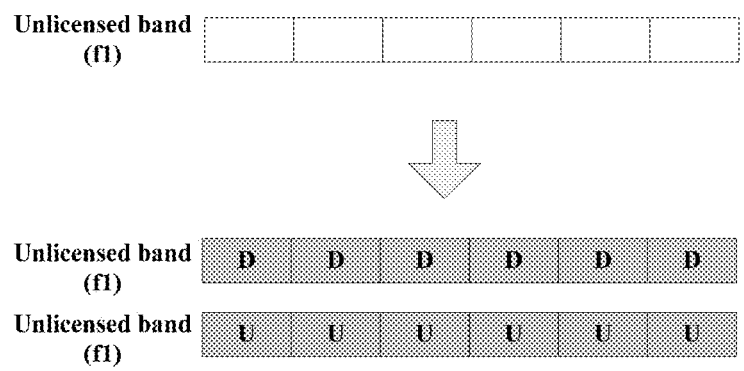
FIG. 5 is a schematic diagram of an unlicensed frequency band that is dynamically reconfigured in Embodiment 1 of this disclosure.

FIG. 5 is a schematic diagram of the unlicensed frequency band that is dynamically configured as an uplink frequency band and a downlink frequency band in the embodiment of this disclosure. As shown in FIG. 5, a carrier frequency of the conventional unlicensed frequency band is f1. After being reconfigured by the indication information, the unlicensed frequency band may perform uplink transmission and downlink transmission at any moment. And whether uplink transmission or downlink transmission is performed at a moment may be determined by, for example, the scheduling information.

In this embodiment, the indication information may be transmitted to the UE via a system message or a specific message. In case of the system message, the indication information may be received and adopted by all UEs in a cell capable of understanding the message. And in case of the specific message, the indication information may be transmitted to specific UEs via the message, hence, only UEs receiving the message may adopt the indication information.

Hence, by reconfiguring the indication information of the half-duplex frequency band, the half-duplex frequency band being configured as both an uplink frequency band and a downlink frequency band at the same time can be supported.

In this embodiment, a transmission point performing downlink service on the half-duplex frequency band is different from a transmission point performing an uplink service on the half-duplex frequency band. From a view point of a cell, a part of multiple UEs of the same cell perform uplink transmission on the half-duplex frequency band, and at the same time, another part of the UEs perform downlink transmission on the half-duplex frequency band; and a part of multiple UEs of the same cell are served by one or more transmission points, and another part of the UEs are served by one or more other transmission points.

For example, the transmission point may be a macro base station, or a pico base station, or a remote radio head (RRH), etc.; however, this disclosure is not limited thereto.

Figure 6:
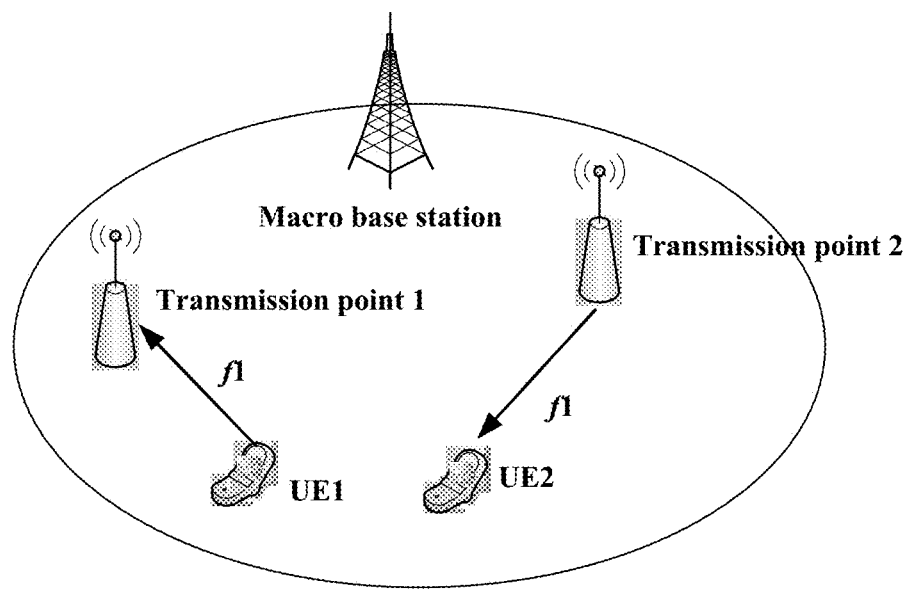
FIG. 6 is a schematic diagram of performing uplink and downlink transmission by multiple UEs in the same cell in Embodiment 1 of this disclosure.

FIG. 6 is a schematic diagram of performing uplink and downlink transmission by multiple UEs in the same cell in the embodiment of this disclosure. As shown in FIG. 6, there may exist a transmission point 1 and a transmission point 2 in a cell (using a frequency band f1) formed by a macro base station, UE 1 and transmission point 1 perform uplink transmission on the frequency band f1, and UE 2 and transmission point 2 perform downlink transmission on the frequency band f1. Hence, a capacity of the cell is not limited too much, and cases where uplink and downlink capacities are relatively large may be well supported.

Activities of the UE shall be further described below.

In this embodiment, the UE may further receive scheduling information transmitted by the network device, and perform uplink transmission or downlink transmission on the half-duplex frequency band according to the scheduling information.

Figure 7:
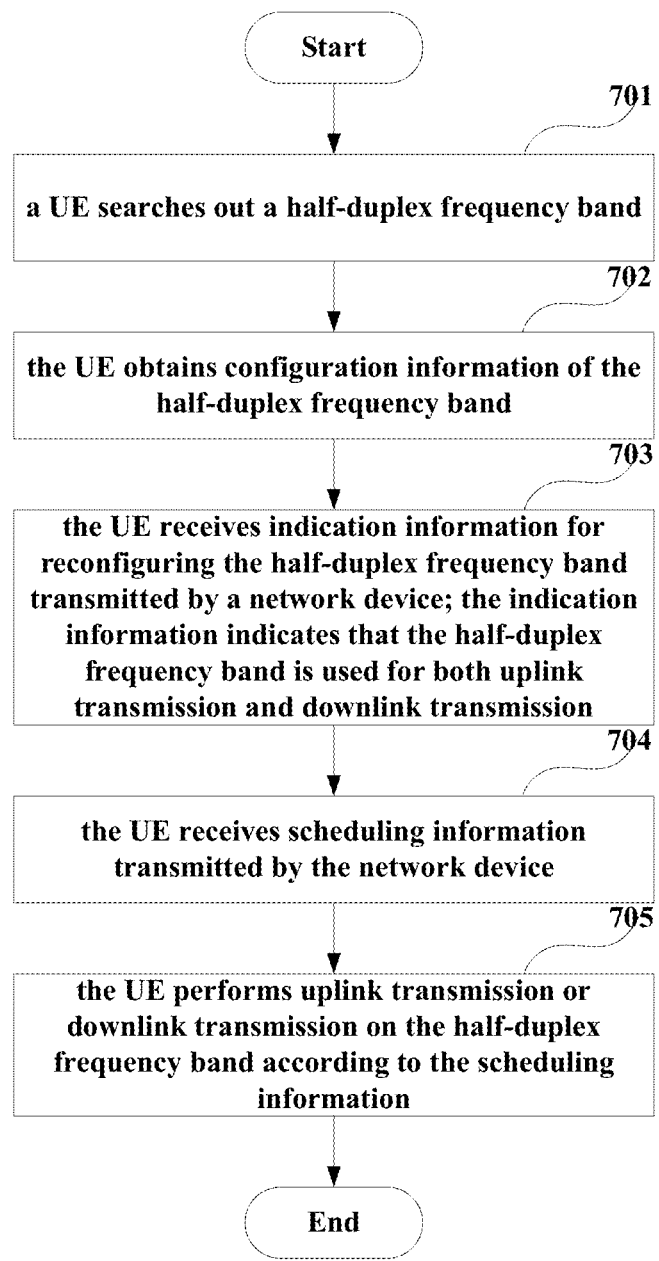
FIG. 7 is another flowchart of the frequency band configuration method of Embodiment 1 of this disclosure.

FIG. 7 is another flowchart of the frequency band configuration method of the embodiment of this disclosure, in which a case of performing scheduling on the reconfigured half-duplex frequency band is shown. As shown in FIG. 7, the method includes:

Block 701: a UE searches out a half-duplex frequency band.

Block 702: the UE obtains configuration information of the half-duplex frequency band.

Block 703: the UE receives indication information for reconfiguring the half-duplex frequency band transmitted by a network device; the indication information indicates that the half-duplex frequency band is used for both uplink transmission and downlink transmission.

Block 704: the UE receives scheduling information transmitted by the network device.

For example, the UE may receive the scheduling information on the half-duplex frequency band, or receive the scheduling information on a frequency band other than the half-duplex frequency band in a cross-carrier scheduling manner.

The scheduling information may include one or more of the following information: information on a scheduled frequency band, information on a scheduled direction (such as uplink or downlink), information on a scheduled timeslot, information on a scheduled resource, and information on a modulation and coding scheme, etc.

Block 705: the UE performs uplink transmission or downlink transmission on the half-duplex frequency band according to the scheduling information;

for example, at a timeslot, when the UE is scheduled on the half-duplex frequency band, the UE performs uplink transmission or downlink transmission on the half-duplex frequency band at the timeslot according to the scheduling information.

It should be noted that FIG. 7 only schematically explains the embodiment of this disclosure; however, this disclosure is not limited thereto. For example, an order of execution of the blocks or steps may be appropriately adjusted, and furthermore, some other blocks or steps may be added, or some of these blocks or steps may be reduced. And appropriate modifications may be made by those skilled in the art according to what is described above, without being limited to those contained in the above figure.

In this embodiment, at a timeslot, when the UE is not scheduled on the half-duplex frequency band, the UE performs uplink transmission or downlink transmission on the half-duplex frequency band at the timeslot according to a predetermined default setting.

For example, if the UE is not scheduled on the half-duplex frequency band at a current timeslot, the UE may be in an uplink transmission state or a downlink reception state according to the default setting.

In this embodiment, at a timeslot, when the UE is not scheduled on the half-duplex frequency band, the UE performs uplink transmission or downlink transmission on the half-duplex frequency band at the timeslot according to the configuration information.

For example, if the frequency band is a TDD frequency band, the UE may determine uplink and downlink configuration of a timeslot according to received TDD configuration information (for example, the TDD configuration information indicates uplink and downlink configuration of each timeslot). If the frequency band is an FDD downlink band, the UE may determine that it is in a downlink reception state at the timeslot according to received FDD configuration information. And if the frequency band is an FDD uplink band, the UE may determine that it is in an uplink transmission state at the timeslot according to the received FDD configuration information.

In this embodiment, the UE may perform uplink transmission or downlink transmission on the half-duplex frequency band according to a timing relationship of an FDD mode, that is, it works in the FDD mode whatever the frequency band is.

For example, the UE follows the timing relationship in the FDD mode, and if it is scheduled as uplink or downlink within a timeslot n, it may feed back ACK/NACK within a timeslot n+4.

It can be seen from the above embodiment that the UE receives the indication information for reconfiguring the half-duplex frequency band transmitted by the network side device; the indication information indicates that the half-duplex frequency band is used for both uplink transmission and downlink transmission. Hence, it is supported that the half-duplex frequency band can be configured as both an uplink frequency band and a downlink frequency band at the same time, a cell capacity is not limited too much, and cases where uplink and downlink capacities are relatively large can be well supported.

Embodiment 2

The embodiment of the present disclosure provides a frequency band configuration method, applicable to a network device in a half-duplex system, with contents identical to those in Embodiment 1 being not going to be described herein any further.

Figure 8:
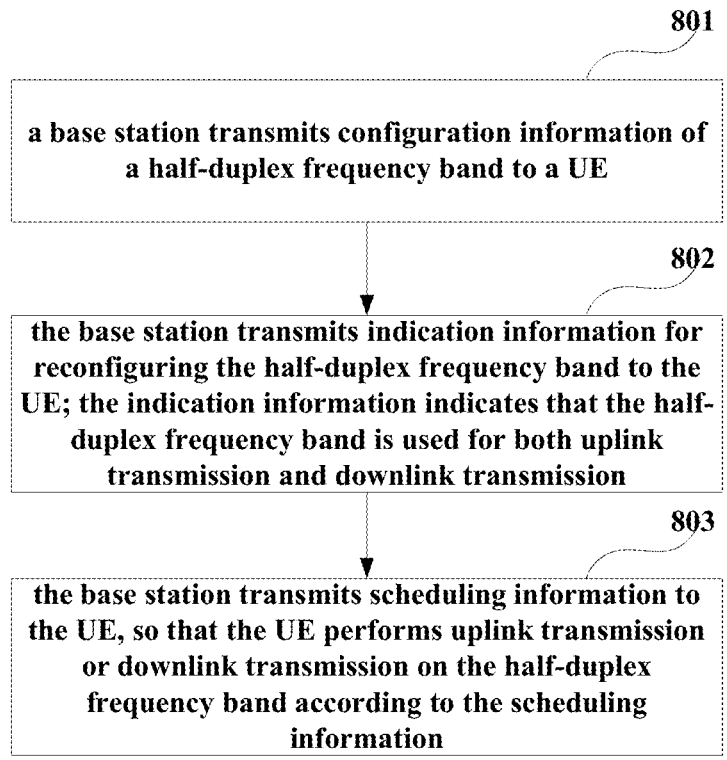
FIG. 8 is a flowchart of the frequency band configuration method of Embodiment 2 of this disclosure.

FIG. 8 is a flowchart of the frequency band configuration method of the embodiment of this disclosure. As shown in FIG. 8, the frequency band configuration method includes:

Block 801: a base station transmits configuration information of a half-duplex frequency band to a UE; and Block 802: the base station transmits indication information for reconfiguring the half-duplex frequency band to the UE; the indication information indicates that the half-duplex frequency band is used for both uplink transmission and downlink transmission.

As shown in FIG. 8, the method may further include:

Block 803: the base station transmits scheduling information to the UE, so that the UE performs uplink transmission or downlink transmission on the half-duplex frequency band according to the scheduling information.

In this embodiment, a part of multiple UEs in the same cell may perform uplink transmission on the half-duplex frequency band, and at the same time, another part of UEs may perform downlink transmission on the half-duplex frequency band. And a part of multiple UEs in the same cell may be served by one or more transmission points, and at the same time, another part of UEs may be served by one or more other transmission points.

It can be seen from the above embodiment that the network device transmits the indication information for reconfiguring the half-duplex frequency band; the indication information indicates that the half-duplex frequency band is used for both uplink transmission and downlink transmission. Hence, it is supported that the half-duplex frequency band can be configured as both an uplink frequency band and a downlink frequency band at the same time, a cell capacity is not limited too much, and cases where uplink and downlink capacities are relatively large can be well supported.

Embodiment 3

The embodiment of the present disclosure provides a frequency band configuration apparatus, configured in a UE in a half-duplex system, with contents identical to those in Embodiment 1 being not going to be described herein any further.

Figure 9:
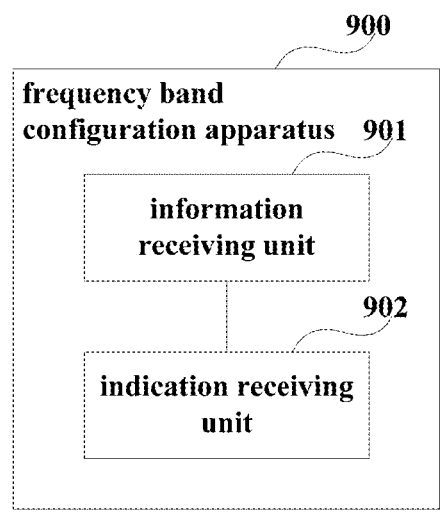
FIG. 9 is a schematic diagram of the frequency band configuration apparatus of Embodiment 3 of this disclosure.

FIG. 9 is a schematic diagram of the frequency band configuration apparatus of the embodiment of this disclosure. As shown in FIG. 9, the frequency band configuration apparatus 900 includes:

an information receiving unit 901 configured to determine a half-duplex frequency band, and receive configuration information of the half-duplex frequency band; and an indication receiving unit 902 configured to receive indication information for reconfiguring the half-duplex frequency band transmitted by a network device; the indication information indicates that the half-duplex frequency band is used for both uplink transmission and downlink transmission.

In an embodiment, the indication information may further include information related to the half-duplex frequency band. And a transmission point performing downlink service on the half-duplex frequency band is different from a transmission point performing an uplink service on the half-duplex frequency band.

In an embodiment, the half-duplex frequency band may be a TDD frequency band, or an FDD downlink frequency band, or an FDD uplink frequency band, or an unlicensed frequency band; however, this disclosure is not limited thereto.

Figure 10:
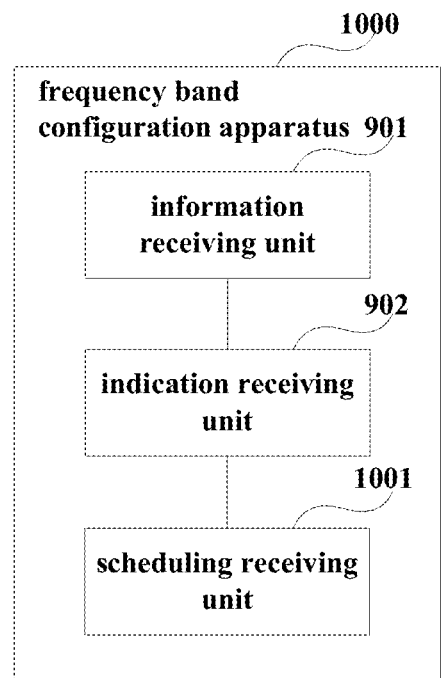
FIG. 10 is another schematic diagram of the frequency band configuration apparatus of Embodiment 3 of this disclosure.

FIG. 10 is another schematic diagram of the frequency band configuration apparatus of the embodiment of this disclosure. As shown in FIG. 10, the frequency band configuration apparatus 1000 includes an information receiving unit 901 and an indication receiving unit 902, as described above.

As shown in FIG. 10, the frequency band configuration apparatus 1000 may further include:

a scheduling receiving unit 1001 configured to receive scheduling information transmitted by the network device, and perform uplink transmission or downlink transmission on the half-duplex frequency band according to the scheduling information.

For example, the scheduling receiving unit 1001 may receive the scheduling information on the half-duplex frequency band, or receive the scheduling information on a frequency band other than the half-duplex frequency band in a cross-carrier scheduling manner.

In an embodiment, when the UE is scheduled on the half-duplex frequency band at a timeslot, the UE performs uplink transmission or downlink transmission on the half-duplex frequency band at the timeslot according to the scheduling information.

In an embodiment, when the UE is not scheduled on the half-duplex frequency band at a timeslot, the UE performs uplink transmission or downlink transmission on the half-duplex frequency band at the timeslot according to a predetermined default setting.

In an embodiment, when the UE is not scheduled on the half-duplex frequency band at a timeslot, the UE performs uplink transmission or downlink transmission on the half-duplex frequency band at the timeslot according to the configuration information.

In an embodiment, the scheduling information may include one or more of the following information: information on a scheduled frequency band, information on a scheduled direction, information on a scheduled timeslot, information on a scheduled resource, and information on a modulation and coding scheme.

In an embodiment, the UE may perform uplink transmission or downlink transmission on the half-duplex frequency band according to a timing relationship of a frequency division duplex mode.

This embodiment further provides a UE, configured with the above-described frequency band configuration apparatus 900 or 1000.

Figure 11:
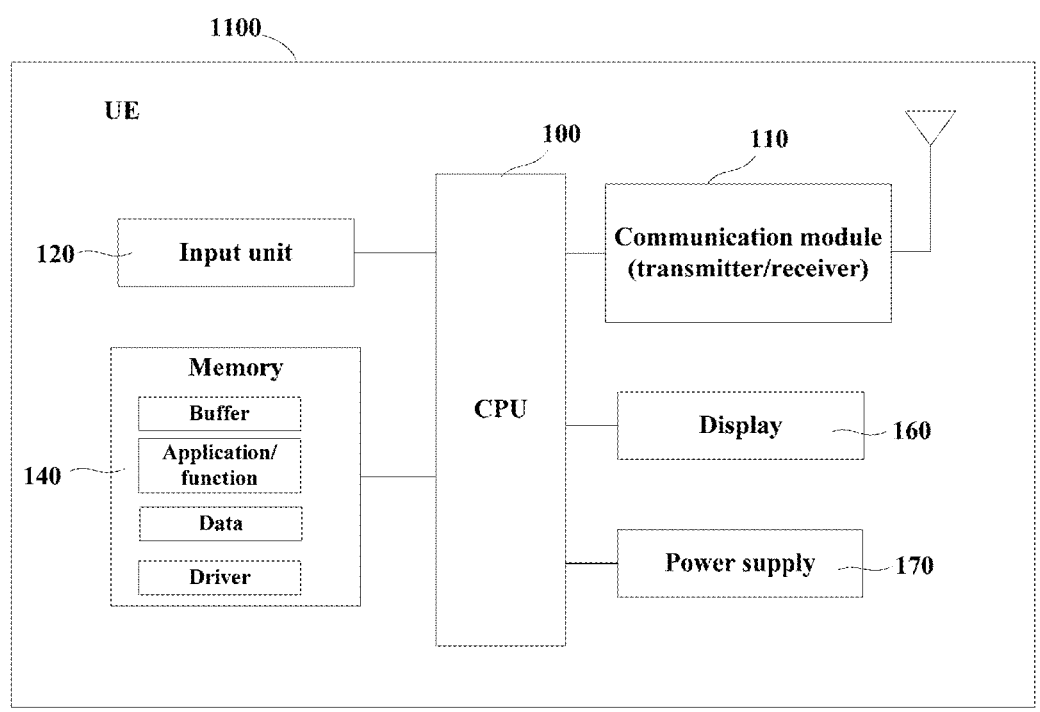
FIG. 11 is a schematic diagram of the UE of Embodiment 3 of this disclosure.

FIG. 11 is a schematic diagram of the UE of the embodiment of this disclosure. As shown in FIG. 11, the UE 1100 may include a central processing unit 100 and a memory 140, the memory 140 being coupled to the central processing unit 100. It should be noted that this figure is illustrative only, and other types of structures may also be used, so as to supplement or replace this structure and achieve a telecommunication function or other functions.

In one implementation, the functions of the frequency band configuration apparatus 900 or 1000 may be integrated into the central processing unit 100. The central processing unit 100 may be configured to carry out the frequency band configuration method described in Embodiment 1.

For example, the central processing unit 100 may be configured to perform the following control: searching out a half-duplex frequency band and receiving configuration information of the half-duplex frequency band; and receiving indication information for reconfiguring the half-duplex frequency band transmitted by a network side device; the indication information indicates that the half-duplex frequency band is used for both uplink transmission and downlink transmission.

In another implementation, the frequency band configuration apparatus 900 or 1000 and the central processing unit 100 may be configured separately. For example, the frequency band configuration apparatus 900 or 1000 may be configured as a chip connected to the central processing unit 100, with its functions being realized under control of the central processing unit 100.

As shown in FIG. 11, the UE 1100 may further include a communication module 110, an input unit 120, a display 160 and a power supply 170. Functions of the above components are similar to those in the relevant art, and shall not be described herein any further. It should be noted that the UE 1100 does not necessarily include all the parts shown in FIG. 11, and furthermore, the UE 1100 may include parts not shown in FIG. 11, and the relevant art may be referred to.

It can be seen from the above embodiment that the UE receives the indication information for reconfiguring the half-duplex frequency band transmitted by the network side device; the indication information indicates that the half-duplex frequency band is used for both uplink transmission and downlink transmission. Hence, it is supported that the half-duplex frequency band can be configured as both an uplink frequency band and a downlink frequency band at the same time, a cell capacity is not limited too much, and cases where uplink and downlink capacities are relatively large can be well supported.

Embodiment 4

The embodiment of the present disclosure provides a frequency band configuration apparatus, configured in a network device in a half-duplex system, with contents identical to those in Embodiment 1 or 2 being not going to be described herein any further.

Figure 12:
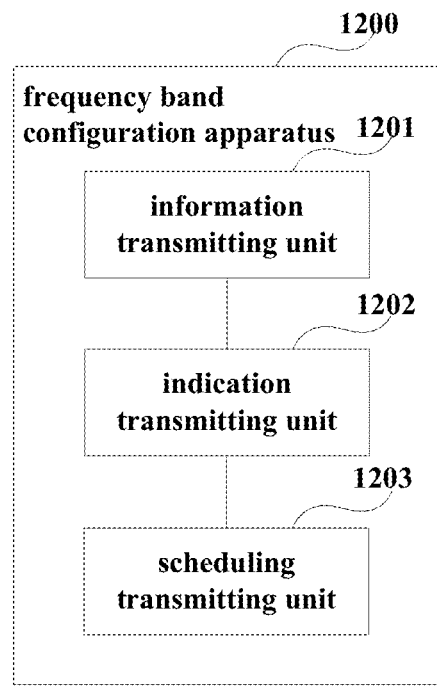
FIG. 12 is a schematic diagram of the frequency band configuration apparatus of Embodiment 4 of this disclosure.

FIG. 12 is a schematic diagram of the frequency band configuration apparatus of the embodiment of this disclosure. As shown in FIG. 12, the frequency band configuration apparatus 1200 includes:

an information transmitting unit 1201 configured to transmit configuration information of a half-duplex frequency band to a UE; and an indication transmitting unit 1201 configured to transmit indication information for reconfiguring the half-duplex frequency band to the UE; the indication information indicates that the half-duplex frequency band is used for both uplink transmission and downlink transmission.

As shown in FIG. 12, the frequency band configuration apparatus 1200 may further include:

a scheduling transmitting unit 1203 configured to transmit scheduling information to the UE, so that the UE performs uplink transmission or downlink transmission on the half-duplex frequency band according to the scheduling information.

In an embodiment, a part of multiple UEs in the same cell perform uplink transmission on the half-duplex frequency band, and at the same time, another part of UEs perform downlink transmission on the half-duplex frequency band. And a part of multiple UEs in the same cell are served by one or more transmission points, and at the same time, another part of UEs are served by one or more other transmission points.

In this embodiment, the network device may be a base station; however, this disclosure is not limited thereto.

Figure 13:
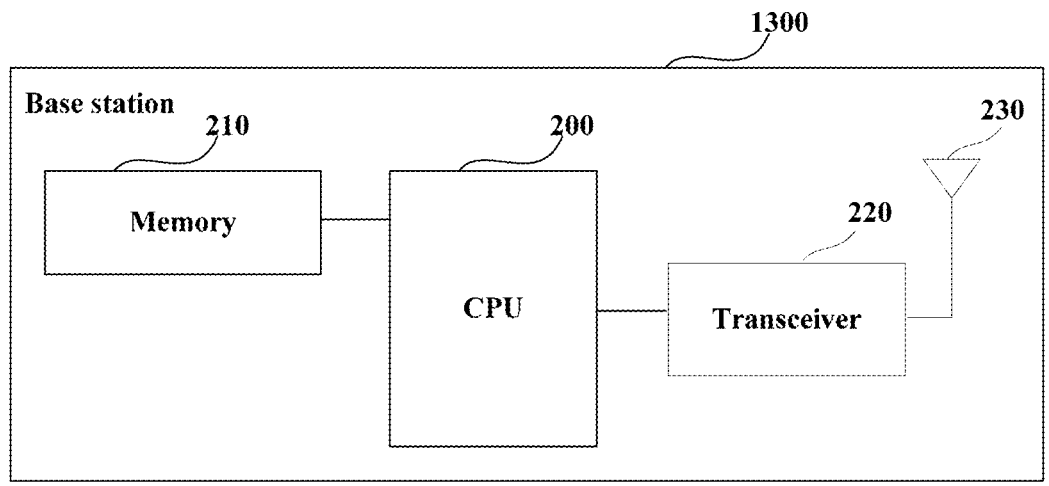
FIG. 13 is a schematic diagram of the base station of Embodiment 4 of this disclosure.

FIG. 13 is a schematic diagram of the base station of the embodiment of this disclosure. As shown in FIG. 13, the base station 1300 may include a central processing unit (CPU) 200 and a memory 210, the memory 210 being coupled to the central processing unit 200. The memory 210 may store various data, and furthermore, it may store a program for information processing, and execute the program under control of the central processing unit 200.

The central processing unit 200 may be configured to carry out the frequency band configuration method in Embodiment 2. For example, the central processing unit 200 may be configured to perform the following control: transmitting configuration information of a half-duplex frequency band to a UE; and transmitting indication information for reconfiguring the half-duplex frequency band by the network device to the UE; the indication information indicates that the half-duplex frequency band is used for both uplink transmission and downlink transmission.

Furthermore, as shown in FIG. 13, the base station 1300 may include a transceiver 220, and an antenna 230, etc. Functions of the above components are similar to those in the relevant art, and shall not be described herein any further. It should be noted that the base station 1300 does not necessarily include all the parts shown in FIG. 13, and furthermore, the base station 1300 may include parts not shown in FIG. 13, and the relevant art may be referred to.

It can be seen from the above embodiment that the network device transmits the indication information for reconfiguring the half-duplex frequency band; wherein, the indication information indicates that the half-duplex frequency band is used for both uplink transmission and downlink transmission. Hence, it is supported that the half-duplex frequency band can be configured as both an uplink frequency band and a downlink frequency band at the same time, a cell capacity is not limited too much, and cases where uplink and downlink capacities are relatively large can be well supported.

Embodiment 5

The embodiment of the present disclosure provides a communication system, with contents identical to those in embodiments 1-4 being not going to be described herein any further.

Figure 14:
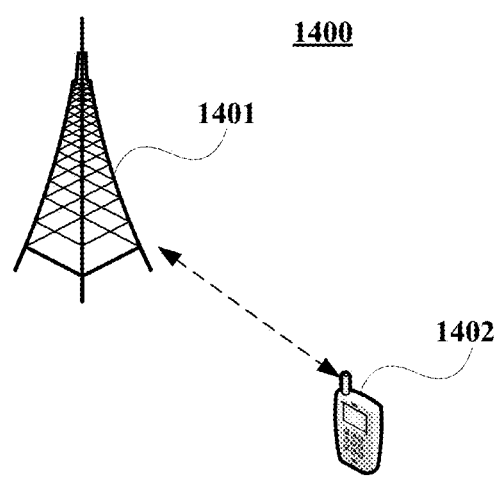
FIG. 14 is a schematic diagram of the communication system of Embodiment 5 of this disclosure.

FIG. 14 is a schematic diagram of the communication system of the embodiment of this disclosure. As shown in FIG. 14, the communication system 1400 may include a base station 1401 and a UE 1402.

The base station 1401 transmits configuration information of a half-duplex frequency band to the UE 1402, and transmits indication information for reconfiguring the half-duplex frequency band to the UE 1402; the indication information indicates that the half-duplex frequency band is used for both uplink transmission and downlink transmission;

and the UE 1402 obtains configuration information of the half-duplex frequency band, and receives indication information for reconfiguring the half-duplex frequency band.

An embodiment of the present disclosure provides a computer readable program code, which, when executed in a UE, will cause a computer unit to carry out the frequency band configuration method described in Embodiment 1 in the UE.

An embodiment of the present disclosure provides a computer readable medium, including a computer readable program code, which will cause a computer unit to carry out the frequency band configuration method described in Embodiment 1 in a UE.

An embodiment of the present disclosure provides a computer readable program code, which, when executed in a base station, will cause a computer unit to carry out the frequency band configuration method described in Embodiment 2 in the base station.

An embodiment of the present disclosure provides a computer readable medium, including a computer readable program code, which will cause a computer unit to carry out the frequency band configuration method described in Embodiment 2 in a base station.

The above apparatuses of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The above frequency band configuration methods and/or apparatuses of this disclosure may be directly embodied as hardware, software modules executed by a processor, or a combination thereof. For example, one or more functional block diagrams and/or one or more combinations of the functional block diagrams shown in FIG. 9 (such as the information receiving unit, and the indication receiving unit, etc.) may either correspond to software modules of procedures of a computer program, or correspond to hardware modules. Such software modules may respectively correspond to the steps shown in FIG. 1. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in figures may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A frequency band configuration apparatus, configured in a user equipment (UE) of a half-duplex system, the frequency band configuration apparatus comprising:
   a memory that stores a plurality of instructions;
   a processor that couples to the memory and configured to execute the instructions to:
   receive indication information for configuring a half-duplex frequency band transmitted by a network device, wherein the indication information indicates that the half-duplex frequency band is used for both uplink transmission and downlink transmission; and
   receive scheduling information transmitted by the network device, and dynamically perform uplink transmission or downlink transmission on the half-duplex frequency band according to the scheduling information.

2. The frequency band configuration apparatus according to claim 1, wherein the indication information further comprises information related to the half-duplex frequency band.

3. The frequency band configuration apparatus according to claim 1, wherein the half-duplex frequency band is a time division duplex frequency band, or a frequency division duplex downlink frequency band, or a frequency division duplex uplink frequency band, or an unlicensed frequency band.

4. The frequency band configuration apparatus according to claim 1, wherein a transmission point performing downlink service on the half-duplex frequency band is different from a transmission point performing an uplink service on the half-duplex frequency band.

5. The frequency band configuration apparatus according to claim 1, wherein when the UE is scheduled on the half-duplex frequency band at a timeslot, the UE performs uplink transmission or downlink transmission on the half-duplex frequency band at the timeslot according to the scheduling information.

6. The frequency band configuration apparatus according to claim 1, wherein when the UE is not scheduled on the half-duplex frequency band at a timeslot, the UE performs uplink transmission or downlink transmission on the half-duplex frequency band at the timeslot according to a predetermined default setting.

7. The frequency band configuration apparatus according to claim 1, wherein when the UE is not scheduled on the half-duplex frequency band at a timeslot, the UE performs uplink transmission or downlink transmission on the half-duplex frequency band at the timeslot according to the configuration information.

8. The frequency band configuration apparatus according to claim 1, wherein the scheduling information comprises one or more of the following information: information on a scheduled frequency band, information on a scheduled direction, information on a scheduled timeslot, information on a scheduled resource, and information on a modulation and coding scheme.

9. The frequency band configuration apparatus according to claim 1, wherein the processor is configured to receive the scheduling information on the half-duplex frequency band, or receive the scheduling information on a frequency band other than the half-duplex frequency band in a cross-carrier scheduling manner.

10. The frequency band configuration apparatus according to claim 1, wherein the UE is configured to perform uplink transmission or downlink transmission on the half-duplex frequency band according to a timing relationship of a frequency division duplex mode.

11. A frequency band configuration apparatus, configured in a network device of a half-duplex system, the frequency band configuration apparatus comprising:
    a memory that stores a plurality of instructions;
    a processor that couples to the memory and configured to execute the instructions to:
    configuring a half-duplex frequency band to a User Equipment (UE), wherein the indication information indicates that the half-duplex frequency band is used for both uplink transmission and downlink transmission; and
    transmit scheduling information to the UE, wherein the UE dynamically performs uplink transmission or downlink transmission on the half-duplex frequency band according to the scheduling information.

12. The frequency band configuration apparatus according to claim 11, wherein a part of multiple UEs in the same cell perform uplink transmission on the half-duplex frequency band, and at the same time, another part of UEs perform downlink transmission on the half-duplex frequency band.

13. The frequency band configuration apparatus according to claim 11, wherein a part of multiple UEs in the same cell are served by one or more transmission points, and at the same time, another part of UEs are served by one or more other transmission points.

14. A communication system, performing half-duplex communication, the communication system comprising:
   a base station configured to:
      transmit indication information for configuring a half-duplex frequency band to a User Equipment (UE), wherein the indication information indicates that the half-duplex frequency band is used for both uplink transmission and downlink transmission; and
      transmit scheduling information to the UE, wherein the UE dynamically performs uplink transmission or downlink transmission on the half-duplex frequency band according to the scheduling information; and
   the UE configured to:
      receive indication information for reconfiguring the half-duplex frequency band; and
      receive scheduling information transmitted by the base station, and dynamically perform uplink transmission or downlink transmission on the half-duplex frequency band according to the scheduling information.

* * * * *